(12) United States Patent
Niwano et al.

(10) Patent No.: US 10,283,922 B2
(45) Date of Patent: May 7, 2019

(54) CONNECTION UNIT FOR CONNECTING EXTERNAL DEVICE TO MEASUREMENT DEVICE AND MEASUREMENT DEVICE OPTIONAL SYSTEM USING THE CONNECTION UNIT

(71) Applicant: MITUTOYO CORPORATION, Kawasaki, Kanagawa (JP)

(72) Inventors: Atsuya Niwano, Tokyo (JP); Shuji Hayashida, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 15/724,462

(22) Filed: Oct. 4, 2017

(65) Prior Publication Data

US 2018/0115129 A1 Apr. 26, 2018

(30) Foreign Application Priority Data

Oct. 21, 2016 (JP) .................. 2016-206789

(51) Int. Cl.
| | |
|---|---|
| *H01R 3/00* | (2006.01) |
| *H01R 31/06* | (2006.01) |
| *G01D 7/00* | (2006.01) |
| *H01R 12/70* | (2011.01) |
| *H01R 12/71* | (2011.01) |
| *H01R 13/512* | (2006.01) |
| *H01R 13/66* | (2006.01) |
| *H01R 13/70* | (2006.01) |

(Continued)

(52) U.S. Cl.
CPC ............. *H01R 31/065* (2013.01); *G01B 3/18* (2013.01); *G01B 3/205* (2013.01); *G01D 7/00* (2013.01); *G08C 15/00* (2013.01); *H01R 12/7076* (2013.01); *H01R 12/716* (2013.01); *H01R 13/512* (2013.01); *H01R 13/6691* (2013.01); *H01R 13/701* (2013.01); *H01R 13/717* (2013.01); *H04Q 9/00* (2013.01)

(58) Field of Classification Search
CPC ................. H01R 31/065; H01R 12/7076; H01R 12/716; H01R 13/512; H01R 13/6691; H01R 13/701; H01R 13/717; G01B 3/18; G01B 3/205; G01D 7/00; G08C 15/00
USPC ......................... 439/488–490, 638
See application file for complete search history.

(56) References Cited

U.S. PATENT DOCUMENTS

| | | | |
|---|---|---|---|
| 6,502,057 B1 | 12/2002 | Suzuki | |
| 6,671,976 B2 * | 1/2004 | Takahashi | H01R 13/2414 33/784 |
| 7,513,038 B2 * | 4/2009 | Koh | H01R 13/6205 29/825 |

FOREIGN PATENT DOCUMENTS

| | | | |
|---|---|---|---|
| JP | 2007-305055 A | 11/2007 | |
| JP | 4456697 B2 | 4/2010 | |

* cited by examiner

*Primary Examiner* — Khiem M Nguyen
(74) *Attorney, Agent, or Firm* — Oliff PLC

(57) ABSTRACT

There is provided a connection unit for connecting an external device to a measurement device.
Connection units 600 and 700 each include a flat plate shaped connection unit main part 610, a connector terminal 651 for measurement device provided at the connection unit main part 610 and connected to a signal inputting/outputting connection port 110 or 210 corresponding to each of measurement devices 100 to 400, and a connector terminal 660 for external device provided at the connection unit main part 610 and connected to a signal inputting/outputting connec- (Continued)

tion port 511 of each of external devices 510 to 540. The connection unit main part 610 is further provided with a manually operable switch.

9 Claims, 9 Drawing Sheets

(51) Int. Cl.
*H01R 13/717* (2006.01)
*G01B 3/18* (2006.01)
*G01B 3/20* (2006.01)
*G08C 15/00* (2006.01)
*H04Q 9/00* (2006.01)

CONNECTION UNIT FOR CONNECTING EXTERNAL DEVICE TO MEASUREMENT DEVICE AND MEASUREMENT DEVICE OPTIONAL SYSTEM USING THE CONNECTION UNIT

INCORPORATION BY REFERENCE

This application is based upon and claims the benefit of priority from Japanese patent application No. 2016-206789, filed on Oct. 21, 2016, the disclosure of which are incorporated herein in its entirety by reference.

BACKGROUND OF THE INVENTION

1. Field of the Invention

The present invention relates to a connection unit for connecting an external device to a measurement device.

2. Description of Related Art

There have been used a caliper, a micrometer, a dial gauge, and the like as a small-sized measurement device which an operator holds to perform measurement. Such a small-sized measurement device has been made multifunctional, and various functions, such as a wireless communication function, are added thereto.

There are some ways to make measurement devices multifunctional. The first way is that various functions are incorporated in a measurement device. For example, a wireless communication function is incorporated. Since a measurement device integrally incorporating various functions is designed, the product has good design qualities and good operability. However, every user does not need all functions. Some users need a wireless communication function, and other users do not need the wireless communication function. Thus, the manufacture is required to manufacture and sell both models of measurement devices with and without a wireless communication function. However, it is not practical to manufacture and sell two models of all products.

For this reason, there is known a type in which a measurement device is provided with a connection port for a connector, and an external device is connected to the connection port via the connector (JP 2007-305055 A and JP 4456697 B). A small-sized measurement device has an advantage of being held with one hand to perform measurement. Nevertheless, the connected external device must not obstruct the measurement. However, the position and the shape of the connection port is restricted according to the model or size of the measurement device. Furthermore, the user's posture of holding a measurement device changes according to the model of the measurement device, an object to be measured, or a place to be measured.

In JP 2007-305055 A, an external wireless communication device includes a connector, a wireless communication device, and a flexible connecting cable which connects the connector to the wireless communication device. With this configuration, it is possible for the flexible connecting cable to connect the wireless communication device to a measurement device regardless of the position and the shape of the connection port.

In an external wireless communication device disclosed in JP 4456697 B, a connector and a wireless communication device are integrated in one unit. By inserting the connector into a connection port, the wireless communication device is fixedly attached to a measurement device. Since the wireless communication function is fixedly attached to the measurement device, the measurement device has good operability.

SUMMARY OF THE INVENTION

In the above description, a wireless communication function has been exemplified, but one or more other functions, such as illumination (light), an auxiliary battery (battery), an external memory (memory), and a printer, are required for some users. It is convenient if these functions can be attached to and detached from a small-sized measurement device as an external device. However, the commercialization of such a product has not been achieved. The following two problems account for the main reason.

First, as disclosed in JP 2007-305055, by connecting an external device to a measurement device by a flexible connecting cable, the external device can be connected to the measurement device regardless of the position and the shape of a connection port. However, when the external device is connected via the cable, the cable obstructs the measurement. This deteriorates the operability which is the advantage of a small-sized measurement device such as a caliper or a micrometer.

The configuration in JP 4456697 B has good operability, since an external device is fixedly attached to a small-sized measurement device. How ever, various types (shapes) of external devices are required to be prepared according to the model or size of the small-sized measurement device. Furthermore, external devices having required functions, such as a wireless communication device, a light, a battery, a memory, and a printer, are required for each measurement device. This burdens a manufacturer as well as a user with significant increase in cost and management, and cannot be practical.

A purpose of the present invention is to provide a connection unit for connecting an external device with a measurement device.

A connection unit in an embodiment of the present embodiment, the connection unit includes:

a connection unit main part;

a connector terminal for measurement device provided at the connection unit main part and connected to a signal inputting/outputting connection port of a measurement device; and a connector terminal for external device provided at the connection unit main part and connected to a signal inputting/outputting connection port of an external device, in which the external device is electrically connected to the measurement device.

In an embodiment of the present invention, it is preferable that the connection unit main part is provided with a manually operable switch.

In an embodiment of the present invention, it is preferable that the connection unit main part is provided with at least either of a lamp or a speaker.

In an embodiment of the present invention, it is preferable that the connection unit main part has a flat plate shape.

In an embodiment of the present invention, it is preferable that:

the connector terminal for measurement device and the connector terminal for external device are provided on the same surface of the connection unit main part, and the surface of the connection unit main part on which the connector terminal for measurement device and the connector terminal for external device are provided is substantially flat.

In an embodiment of the present invention, it is preferable that the connection unit main part is molded with resin.

A measurement device optional system in an embodiment of the present invention, the measurement device optional system includes:

the connection unit mentioned above;

several different types of measurement devices having a signal inputting/outputting connection port; and several different types of external devices having a signal inputting/outputting connection port, in which the measurement device is electrically connected to the external device via the connection unit, and the type of the connection port of the external devices is uniform ed.

In an embodiment of the present invention, it is preferable that the at least one external device has a function selected from a wireless communication device, a sub display, a battery, a light, a memory, and a printer.

In an embodiment of the present invention, it is preferable that the at least one measurement device is a caliper, a micrometer, or a dial gauge.

DETAILED DESCRIPTION

The present invention relates to a connection unit for connecting an external device to a measurement device. The connection unit will be described, and the outline of a measurement device optional system implemented by the connection unit will be also described.

Figure 1:
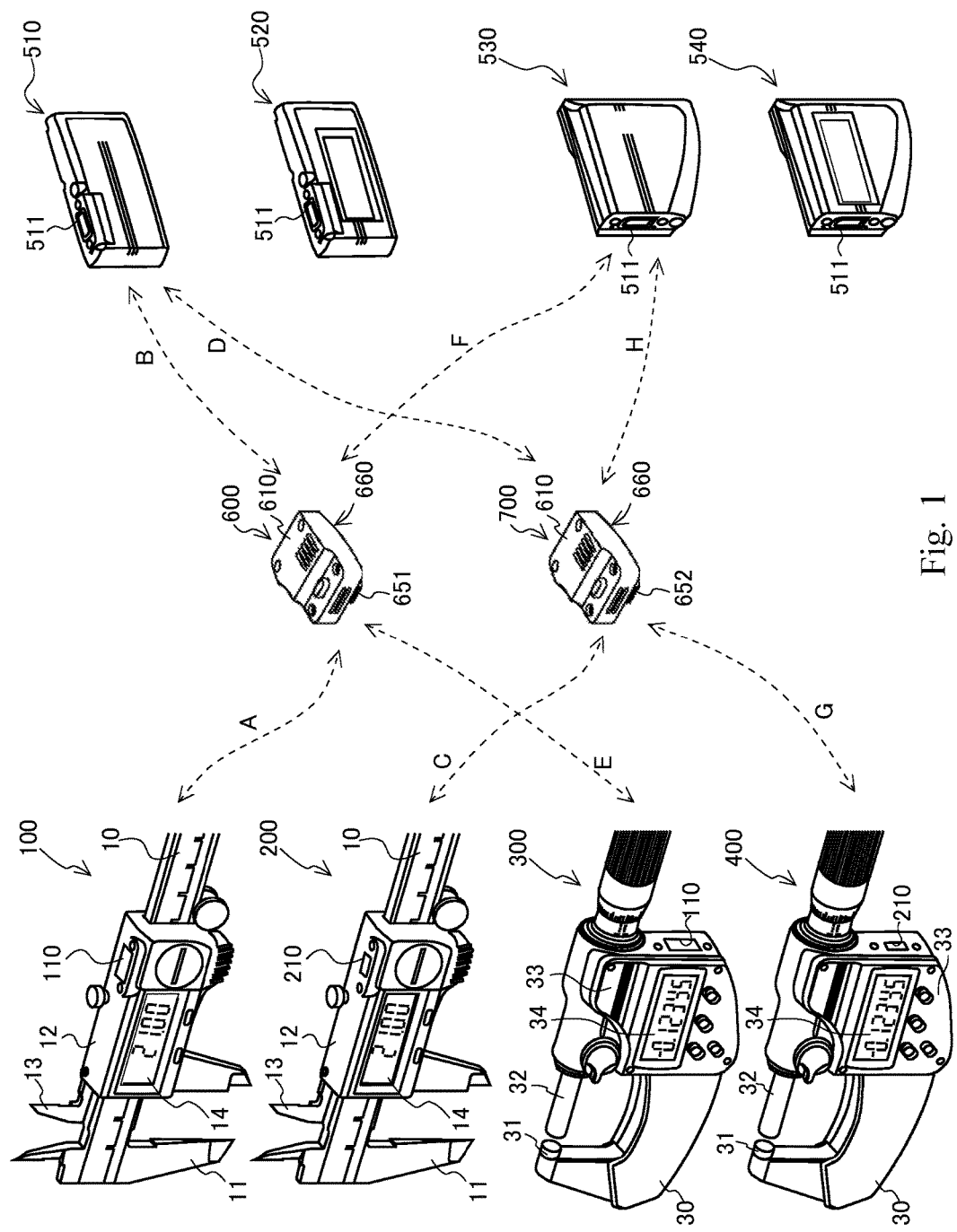
FIG. 1 is a diagram schematically illustrating a configuration of a measurement device optional system implemented by a connection unit of the present invention.

FIG. 1 is a diagram schematically illustrating a configuration of a measurement device optional system implemented by a connection unit of the present invention.

It is assumed that a user already possesses four measurement devices (100, 200, 300, and 400). The four measurement devices are a first caliper 100, a second caliper 200, a first micrometer 300, and a second micrometer 400.

The first caliper 100 differs from the second caliper 200 in the measuring accuracy, the length-measuring range, the presence or absence of water-resistant, the presence or absence of a backlight function of a display 14, and the like. The first caliper 100 and the second caliper 200 have signal inputting/outputting connection ports 110 and 210 respectively. Specifically, a slider 12 of each of the calipers 100 and 200 is an electronic unit, and each of the signal inputting/outputting connection ports 110 and 210 is provided on the upward facing surface of the slider 12. Note that, the measurement means of the caliper is constituted by a jaw 11 of a main scale 10, a jaw 13 of the slider 12, and an encoder (linear encoder) which detects the relative displacement between the main scale 10 and the slider 12.

The first caliper 100 and the second caliper 200 have the signal inputting/outputting connection ports 110 and 210 respectively. However, the type (for example, the shape) of the signal inputting/outputting connection port 110 of the first caliper 100 is different from that of the signal inputting/outputting connection port 210 of the second caliper 200 due to the above function differences. The type of the signal inputting/outputting connection port 110 of the first caliper 100 is referred to as a first type connection port 110, and the type of the signal inputting/outputting connection port 210 of the second caliper 200 is referred to as a second type connection port 210.

Similarly, the first micrometer 300 differs from the second micrometer 400 in the measuring accuracy, the length-measuring range, the presence or absence of water-resistant, the presence or absence of a backlight function of a display 34, and the like. The micrometers 300 and 400 each have a U-shaped frame 30, an anvil 31, a spindle 32, and an electronic unit 33. The anvil 31 is arranged at the inside of one end side of the U-shaped frame 30, and the spindle 32 is provided at the other end side of the U-shaped frame 30 so as to be movable back and forth toward the anvil 31. The spindle 32 moves back and forth with a feeding screw.

A rotary encoder (not illustrated) is further provided at the other end side of the U-shaped frame 30. The rotary encoder is detection means for detecting the rotation quantity of the spindle 32. Here, the measurement means is constituted by the U-shaped frame 30, the anvil 31, the spindle 32, and the rotary encoder.

The electronic unit 33 is provided at the other end side of the U-shaped frame 30. The electronic unit 33 includes an incorporated signal processing unit (not illustrated), the display 34, and either of the signal inputting/outputting connection port 110 or 210. Both connection ports 110 and 210 are provided so as to be opened on a side end surface at the other end side of the U-shaped frame 30.

The first micrometer 300 and the second micrometer 400 have the signal inputting/outputting connection ports 110 and 210 respectively. How ever, the type (for example, the shape) of the signal inputting/outputting connection port 110 of the first micrometer 300 is different from that of the signal inputting/outputting connection port 210 of the second micrometer 400 due to the above differences. Here, it is assumed that the type of the signal inputting/outputting connection port 110 of the first micrometer 300 is the first type connection port 110 which is the same as that of the first caliper 100, and the type of the signal inputting/outputting connection port 210 of the second micrometer 400 is the second type connection port 210 which is the same as that of the second caliper 200.

In order to perform measurement efficiently, a user desires to optionally attach an external wireless communication function or a sub display to either measurement device. At this time, since the shape of the caliper is different from that of the micrometer, external devices suitable for the caliper and the micrometer should be prepared. FIG. 1 illustrates a wireless communication device 510 for caliper, a sub display 520 for caliper, a wireless communication device 530 for micrometer, and a sub display 540 for micrometer.

The external devices 510 and 520 for caliper are designed so that the shapes of the external devices do not obstruct when a user holds the caliper. In other words, each of the external devices 510 and 520 for caliper is designed to have a flat rectangular shape so as to be tightly attached to the back surface of the slider 12 of the caliper 100 or 200.

On the other hand, the external devices 530 and 540 for micrometer are designed so that the shapes of the external devices 530 and 540 do not obstruct when a user holds the micrometer. In other words, each of the external devices 530 and 540 for micrometer is designed to have a flat and substantially rectangular shape so as to be tightly attached to the back surface of the U-shaped frame 30 of the micrometer 300 or 400, and to have a curved lower side so as to be along a part of the U shape.

As described above, the user possesses the four external devices of the wireless communication device 510 for caliper, the sub display 520 for caliper, the wireless communication device 530 for micrometer, and the sub display 540 for micrometer. These four external devices 510, 520, 530, and 540 each have the signal inputting/outputting connection port 511. The connection port 511 of each external device is uniformed in one type, and referred to as a common type connection port 511.

The connection unit will be described below. A connection unit 600 includes a flat rectangular connection unit main part 610, and two connector terminals (651 and 660) provided at the connection unit main part 610.

One terminal 651 of the two connector terminals (651 and 660) is the connector terminal (connector terminal for measurement device) to be connected to the connection port 110 of the measurement device 100 or 300. Here, the types of the connection ports of the measurement devices 100 to 400 are assumed to be two types of the first type connection port 110 and the second type connection port 210. Thus, two types of connection units (600, 700) are prepared according to the types of the connection ports of the measurement devices 100 to 400.

The connector terminal connectable to the first type connection port 110 is referred to as a first type connector terminal 651. The connection unit having the first type connector terminal 651 is referred to as a first type connection unit 600. The connector terminal connectable to the second type connection port 210 is referred to as a second type connector terminal 652. The connection unit having the second type connector terminal 652 is referred to as a second type connection unit 700.

The other terminal 660 of the two connector terminals (651 and 660) is the connector terminal (connector terminal for external device) to be connected to the common type connection port 511 of each of the external devices 510 to 540. The connector terminal connected to the common type connection port 511 of each of the external devices 510 to 540 is referred to as a common type connector terminal 660.

Figure 2:
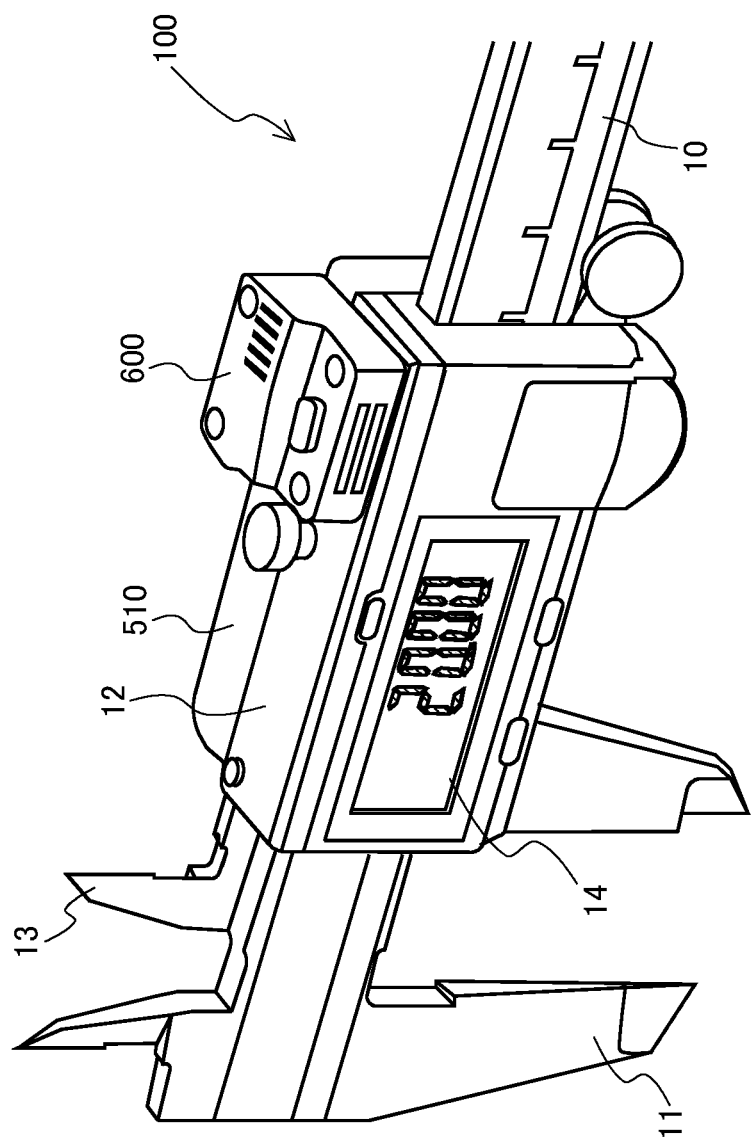
FIG. 2 is a diagram illustrating a wireless communication device for caliper connected to a first caliper by a first type connection unit.
Figure 3:
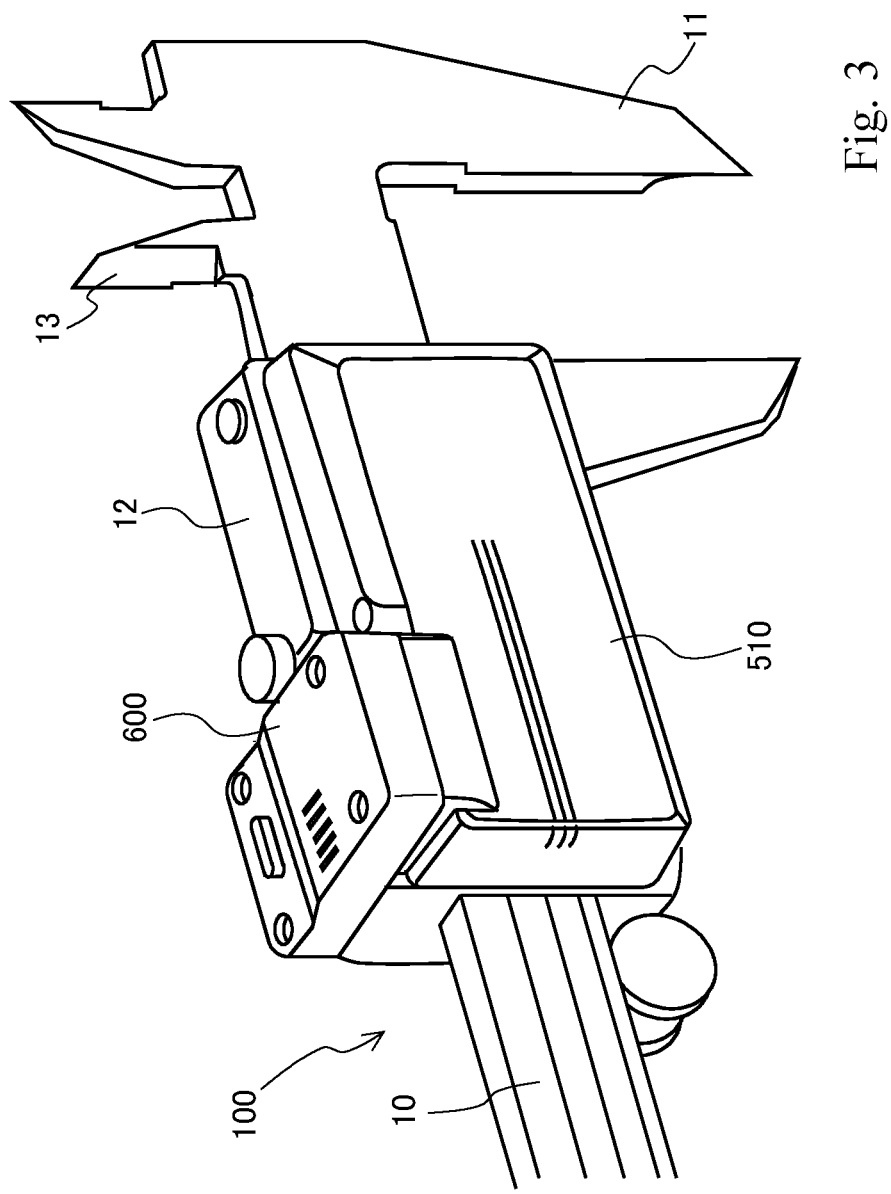
FIG. 3 is a diagram illustrating the wireless communication device for caliper connected to the first caliper by the first type connection unit.

Here, it is assumed that the user desires to optionally add a wireless communication function to the first caliper 100. At this time, the user only prepares the wireless communication device 510 for caliper and the first type connection unit 600. FIGS. 2 and 3 are diagrams illustrating the wireless communication device 510 for caliper connected to the first caliper 100 by the first type connection unit 600.

The first type connector terminal 651 of the first type connection unit 600 is connected to the first type connection port 110 of the first caliper 100, and the common type connector terminal 660 of the first type connection unit 600 is connected to the common type connection port 511 of the wireless communication device 510 for caliper. The first caliper 100 is thereby electrically connected to the wireless communication device 510 for caliper, and the measurement value of the first caliper 100 can be wirelessly output from the wireless communication device 510 for caliper.

When the user desires to use the second caliper 200 with the wireless communication function, the user only prepares the second type connection unit 700 suitable for the second caliper 200 (see the arrow C in FIG. 1). Then, the second type connector terminal 652 of the second type connection unit 700 is connected to the second type connection port 210 of the second caliper 200 (the arrow C in FIG. 1), and the common type connector terminal 660 of the second type connection unit 700 is connected to the common type connection port 511 of the wireless communication device 510 for caliper (the arrow D in FIG. 1).

The second caliper 200 is thereby electrically connected to the wireless communication device 510 for caliper, and the measurement value of the second caliper 200 can be wirelessly output from the wireless the 510 for caliper.

Since a connector and a wireless communication device have been integrated into one unit and cannot be separated (for example, JP 4456697 B), a user has been required to buy a separated unit of a wireless communication device suitable for the second type connection port 210 of the second caliper 200.

On the other hand, the wireless communication device 510 for caliper is separated from the connection unit 600 or 700 in the present invention, and both of the first type connection unit 600 and the second type connection unit 700 can be connected to the same wireless communication device 510 for caliper by the common type connector terminal 660 (the arrows B and D in FIG. 1).

Thus, the user is only required to prepare one wireless communication device 510 for caliper, and the two connection units 600 and 700 for the first caliper 100 and the second caliper 200 respectively (the arrows A and D in FIG. 1). Accordingly, it is possible for the user to reduce the purchase cost as compared with the case in which two wireless communication devices which are substantially the same but have different connector shapes are prepared.

Furthermore, it is possible to reduce the management cost, since the two small connection units 600 and 700 are only required as compared with the case in which two large wireless communication devices are stored.

Accordingly, since the product models can be reduced, it is possible for the manufacturer to reduce the management cost.

The manufacturer is further required to acquire a certification for each country to manufacture and sell wireless communication devices. It has greatly burdened the manufacturer to frequently prepare the documents required for certification examinations to manufacture and sell wireless communication devices which are substantially the same but have different connector shapes.

In this regard, the wireless communication device 510 for caliper is separated from the connection unit 600 or 700, and the wireless communication device 510 for caliper is used commonly by the first caliper 100 and the second caliper 200, whereby it is possible to significantly reduce the time and cost to acquire the certification for wireless communication devices.

A similar effect can be obtained when the sub display 520 for caliper is connected to the first caliper 100 or the second caliper 200. The user is only required to prepare one sub display 520 for caliper, and the two connection units 600 and 700 for the first caliper 100 and the second caliper 200 respectively. Obviously, if the user already possesses the first type connection unit 600 and the second type connection unit 700, the user is only required to buy the sub display 520 for caliper.

Figure 4:
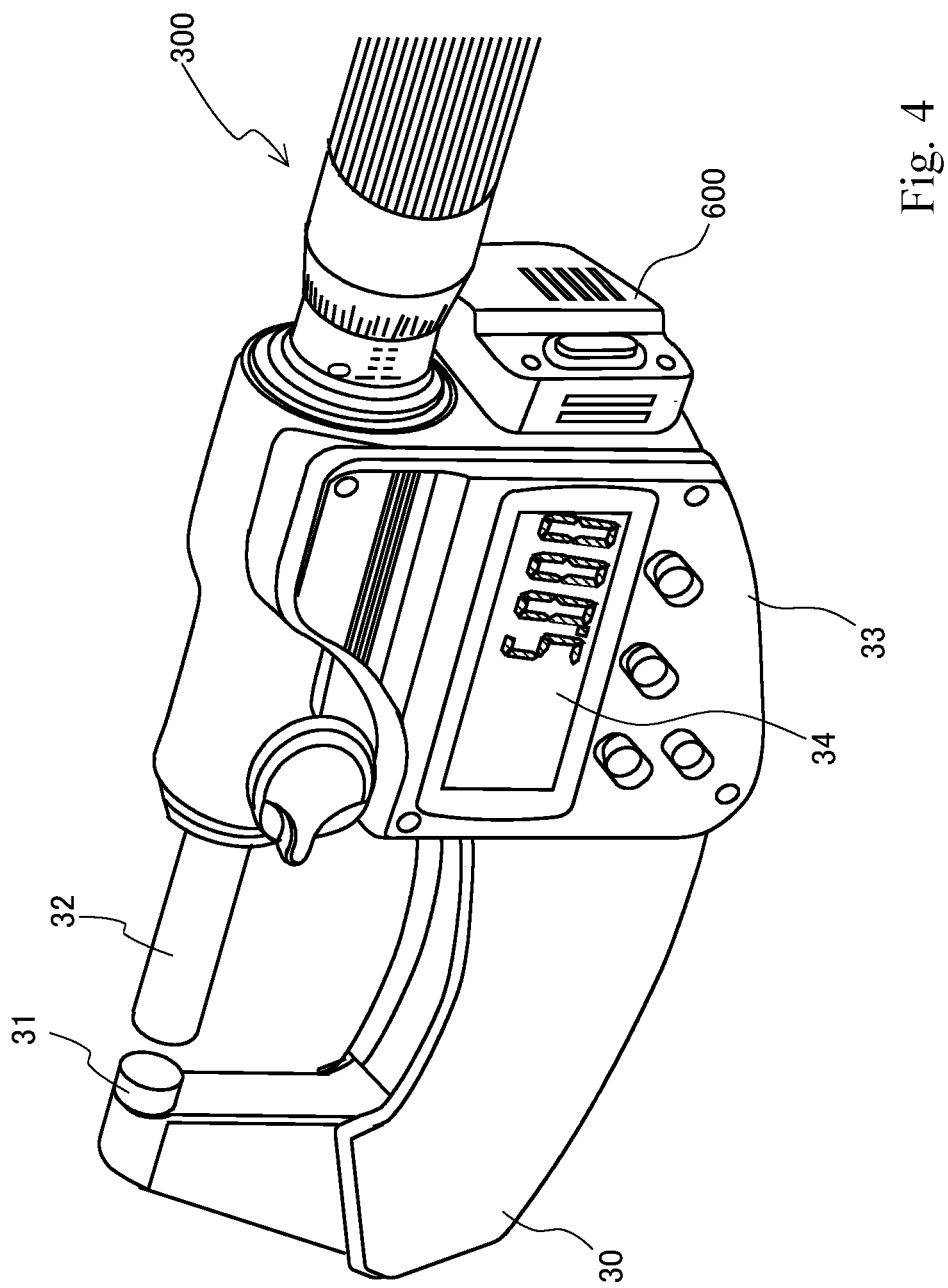
FIG. 4 is a diagram illustrating a wireless communication device for micrometer connected to a first micrometer by the first type connection unit.
Figure 5:
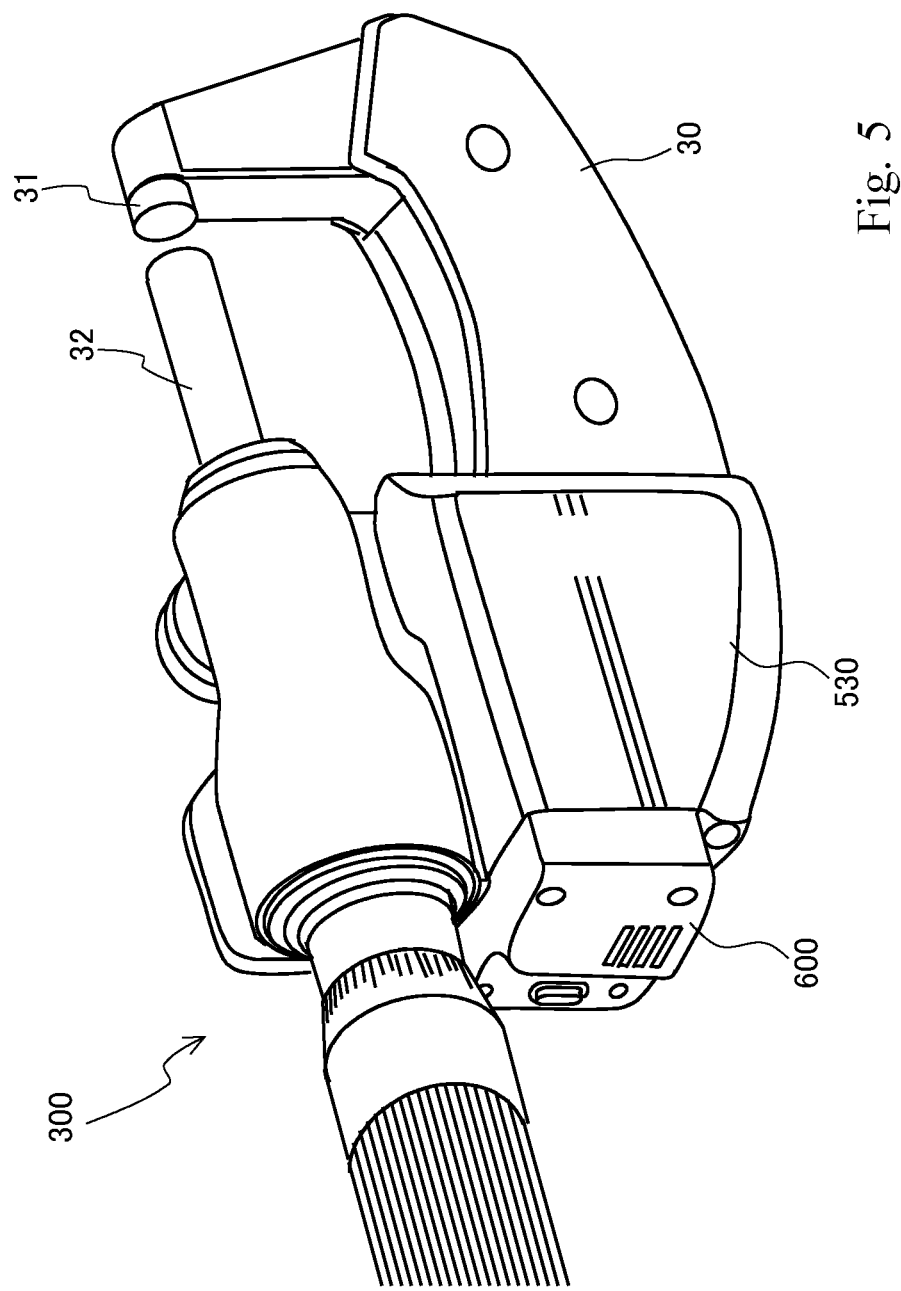
FIG. 5 is a diagram illustrating the wireless communication device for micrometer connected to the first micrometer by the first type connection unit.

It is assumed that a user possesses the first micrometer 300 and the second micrometer 400 in addition to the caliper (the first caliper 100 and the second caliper 200) and desires to add a wireless communication function to the micrometers 300 and 400. FIGS. 4 and 5 illustrate the wireless communication device 530 for micrometer connected to the first micrometer 300 by the first type connection unit 600.

The first type connector terminal 651 of the first type connection unit 600 is connected to the first type connection port 110 of the first micrometer 300 (the arrow E in FIG. 1), and the common type connector terminal 660 of the first type connection unit 600 is connected to the common type connection port 511 of the wireless communication device 530 for micrometer (the arrow F in FIG. 1). The first micrometer 300 is thereby electrically connected to the wireless communication device 530 for micrometer, and the measurement value of the first micrometer 300 can be wirelessly output from the wireless communication device 530 for micrometer.

Then, the second micrometer 400 can be connected to the wireless communication device 530 for micrometer (the arrow H in FIG. 1) by the second type connection unit 700 suitable for the second micrometer 400 (the arrow G in FIG. 1).

Thus, the user is only required to prepare one wireless communication device 530 for micrometer, and the two connection units 600 and 700 for the first micrometer 300 and the second micrometer 400 respectively. A similar effect can be obtained when the sub display 540 for micrometer is connected to the first micrometer 300 or the second micrometer 400. In other words, the user is only required to prepare one sub display 540 for micrometer, and the two connection units for the first micrometer 300 and the second micrometer 400. Obviously, if the use already possesses the first type connection unit 600 and the second type connection unit 700, the user is only required to buy the sub display 540 for micrometer.

Here, the first type connection unit 600 and the second type connection unit 700 can be commonly used by the calipers 100 and 200, and the micrometers 300 and 400 in an embodiment of the present invention. This is implemented by devising the design as described below in addition to unifying the design of the connection ports 110 and 210 with the connector terminals 651 and 652. The devising includes optimization of the position where the common type connection port 511 of each of the external devices 510 to 540 is provided, optimization of the shape of the connection unit main part 610, and optimization of the relative position between the first type connector terminal 651 (or the second connector terminal 652) and the common type connector terminal 660.

As described above, the external devices 510 to 540 are separated from the connection unit 600 or 700, and the external devices 510 to 540 can be used commonly by the multiple types of the measurement devices 100 to 400. The user and the manufacturer can thereby obtain a significant cost reduction effect.

(Connection Unit in First Exemplary Embodiment)

Figure 6:
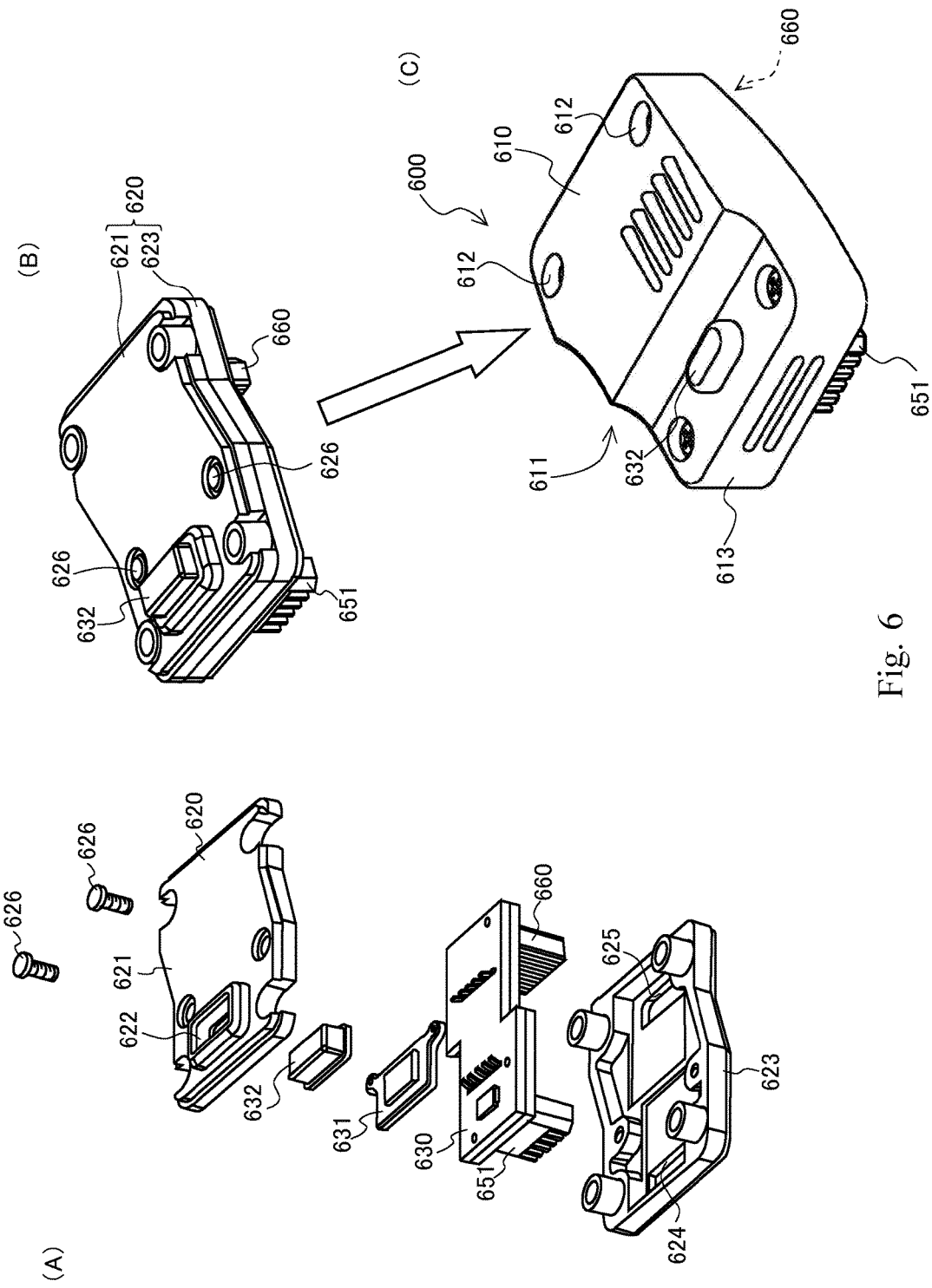
FIG. 6 is a diagram illustrating a connection unit in a first exemplary embodiment.

FIG. 6 is a diagram illustrating a first exemplary embodiment of a connection unit.

FIG. 6 illustrates a first type connection unit 600. However, the only difference between the first type connection unit 600 and a second type connection unit 700 is a connector terminal (a first type connector terminal 651 or a second type connector terminal 652) connected to a connection port 110 of a measurement device 100 or 300, or to a connection port 210 of a measurement device 200 or 400. Thus, by replacing the first type connector terminal 651 with the second type connector terminal 652 in the following description, the second type connection unit 700 will also be described.

(Specifically, the shape of the first type connector terminal 651 differs from that of the second type connector terminal 652. The relative position between a common type connector terminal 660 and the first type connector terminal 651 also differs from that between the common type connector terminal 660 and the second type connector terminal 652.)

FIG. 6(A) is an exploded perspective view of the connection unit 600.

FIG. 6(B) is a diagram illustrating the connection unit 600 after the parts in FIG. 6(A) are assembled but before being molded.

FIG. 6(C) is a diagram illustrating a finished product of the molded connection unit 600.

As illustrated in FIG. 6(C), the first type connection unit 600 includes a connection unit main part 610, a first type connector terminal 651, a common type connector terminal 660, and an operation button (switch) 632.

The connection unit main part 610 has a flat rectangular plate shape. A feature of the present embodiment is that the connection unit main part 610 is not a connecting cable. In other words, a feature of the present embodiment is that the connection unit serves as a connecting cable. It is assumed that the top and bottom, the left and right, the front side, and the back side are set based on the directions in FIG. 6. The operation button 632 is arranged at one end side (left side) on the upward facing surface of the connection unit main part 610. The operation button 632 is a manually operable switch and can be pushed.

Note that, the surface around the operation button 632 is lower than the uppermost surface of the upward facing surface of the connection unit main part 610, whereby the operation button 632 is hardly damaged and easily pushed.

The first type connector terminal 651 is arranged at one end side (left side) on the downward facing surface of the connection unit main part 610, and the common type connector terminal 660 is arranged at the other end side (right side) of the connection unit main part 610. That is, the first type connector terminal 651 and the common type connector terminal 660 are provided on the same surface (here, the downward facing surface) of the connection unit main part 610 so as to project in the same direction.

Here, for example, FIGS. 2 to 5 are referred to.

Figure 8:
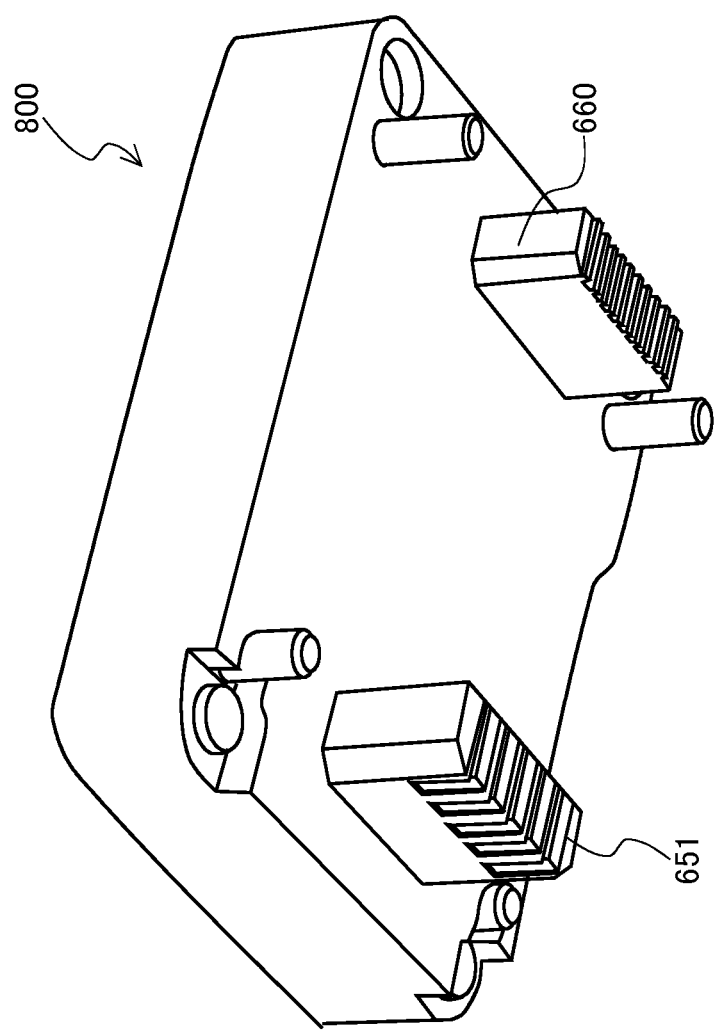
FIG. 8 is a diagram illustrating the connection unit as the first modified example.

In order to connect one of the measurement devices 100 to 400 with one of the external devices 510 to 540, when the relative position between the one of the measurement devices 100 to 400 and the one of the external devices 510 to 540 is aligned, the surface on which the connection port 110 of the measurement device 100 or 300, or the connection port 210 of the measurement device 200 or 400 is provided is to be substantially flush with the surface on which the common type connection port 511 of each of the external devices 510 to 540 is provided. Thus, the downward facing surface of the connection unit main part 610 is substantially flat so as to be flush with the above flush surface. Note that, FIG. 8 illustrates a modified example, but also illustrates the downward facing surface of the connection unit main part and can be referred to.

The connection unit main part 610 has a substantially rectangular shape when viewed from above, but is bent a little in the middle. A bending point 611 is positioned substantially at the center from the one end to the other end, and the other end side is bent so as to shift to the back side. This design is for commonly using the connection unit by the measurement devices, such as the calipers 100 and 200 having a complete different shape from the micrometers 300 and 400, or by the same measurement device, such as the caliper 100 and the caliper 200 or the micrometer 300 and the micrometer 400, having a slightly different positioned connection port. The relative position between the first type connector terminal 651 and the common type connector terminal 660 is thereby adjusted. Furthermore, the external devices 510 and 520 for caliper and the external devices 530 and 540 for micrometer each have the common type connection port 511, and the external devices 510 to 540 each have the shape that does not obstruct measuring either by the caliper 100 or 200, or the micrometer 300 or 400.

Four female screw through holes 612 are provided at the four corners of the connection unit main part 610 when viewed from above.

The operation button 632 is for outputting data. By pushing down the operation button 632, the measurement value of each of the measurement devices 100 to 400 is transmitted to the wireless communication device 510 or 530, and wirelessly output to the outside from the wireless communication device 510 or 530. Obviously, the operation button 632 appropriately serves according to the type of an external device.

With reference to FIG. 6(A), the internal configuration of the first type connection unit 600 is described. A housing part 620 is constituted by a bottom cover 623 and a top cover 621. The housing part 620 defines a housing space therein. A hole 624 is provided at one end side of the bottom cover 623 to expose the first connector terminal 651, and a hole 625 is provided at the other end side to expose the common type connector terminal 660. A hole 622 is provided at one end side of the top cover 621 to expose the operation button 632.

In the housing space of the housing part 620, a circuit board 630, a rubber 631, and the key top of the operation button 632 are arranged in the order from the bottom. The first type connector terminal 651 is arranged at one end side on the downward facing surface of the circuit board 630, and the common type connector terminal 660 is arranged at the other end side. A pushing button switch is arranged on the upward facing surface of the circuit board 630, and the rubber 631 and the key top of the operation button 632 are arranged on the pushing button switch.

The top cover 621 and the bottom cover 623 are tightly fastened by two screws 626, and the housing space is thereby sealed (FIG. 6(B)).

After the parts are assembled into the assembly of FIG. 6(B), the outer periphery of the assembly is fixed by being molded with resin 613 (molding), and sealed liquid-tightly, whereby the water-proofness (oil-proofness) of the connection unit is ensured. Note that, by separating the external devices 510 and 540 from the connection unit 600, the connection unit 600 has a simple rectangular plate shape. Accordingly, it is possible to easily mold the connection unit 600, and reduce the manufacturing cost.

The effects of using the connection unit 600 having such a configuration has been described above. The connection unit 600 is further provided with the operation button 632.

By arranging the operation button 632 on the upward facing surface of the connection unit 600, the operation button 632 having good operability is provided. Although the operation button 632 is also provided to each of the measurement devices 100 to 400, it can be difficult to push the operation button if the operation button is provided at the front side (or the back side) of each of the measurement devices 100 to 400.

In this regard, by providing the operation button 632 at the connection unit 600, the operation button 632 is positioned at the side surface of each of the measurement devices 100 to 400 and is easily pushed. Furthermore, by providing the operation button 632 at the connection unit 600, the number of the operation buttons 632 on the external devices 510 to 540 can be reduced accordingly, and which facilitates downsizing of the external devices 510 to 540, and leads the flexibility in design.

Modified Example

Figure 7:
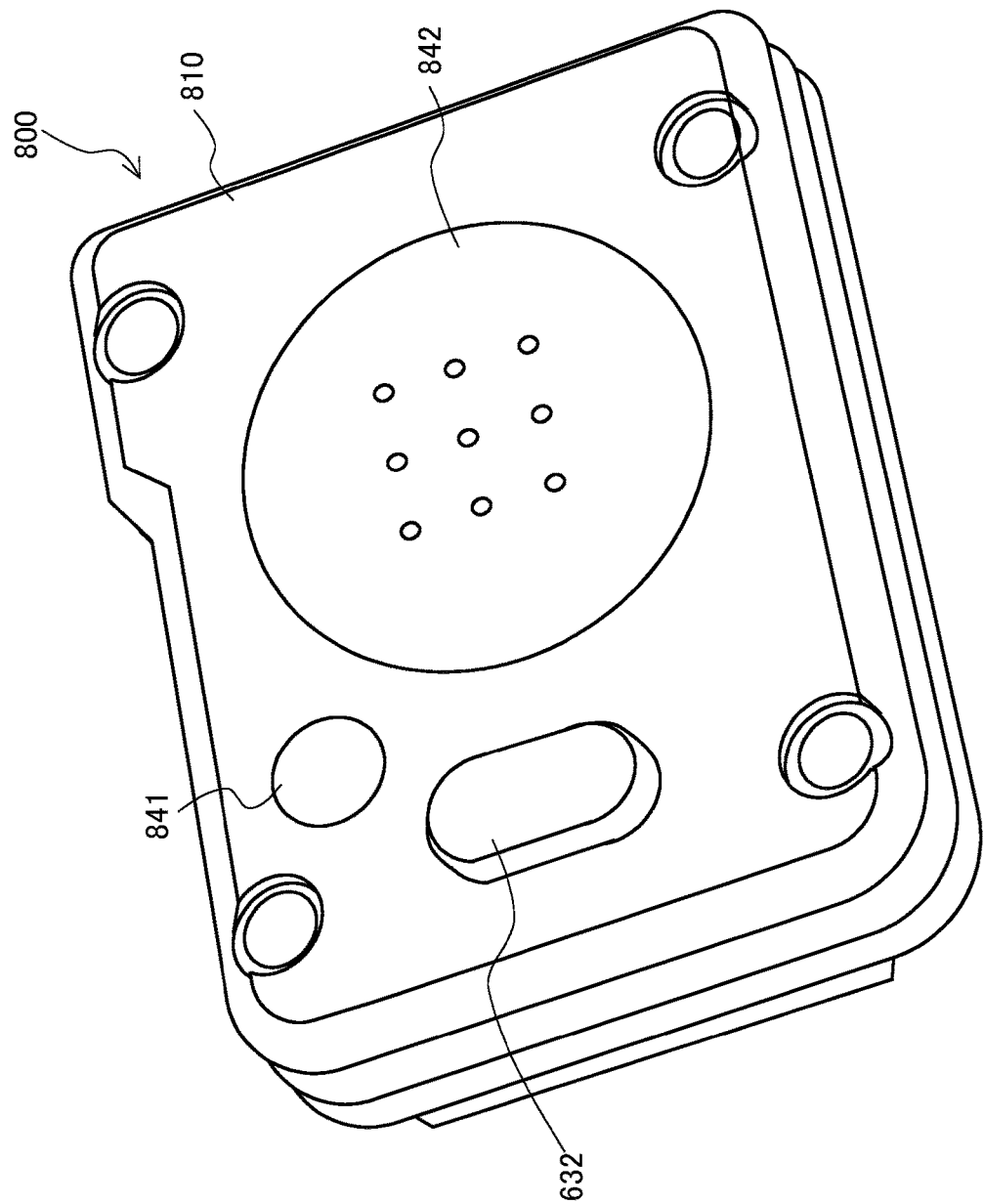
FIG. 7 is a diagram illustrating a connection unit as a first modified example.

FIGS. 7 and 8 illustrate a connection unit 800 as a first modified example.

Figure 9:
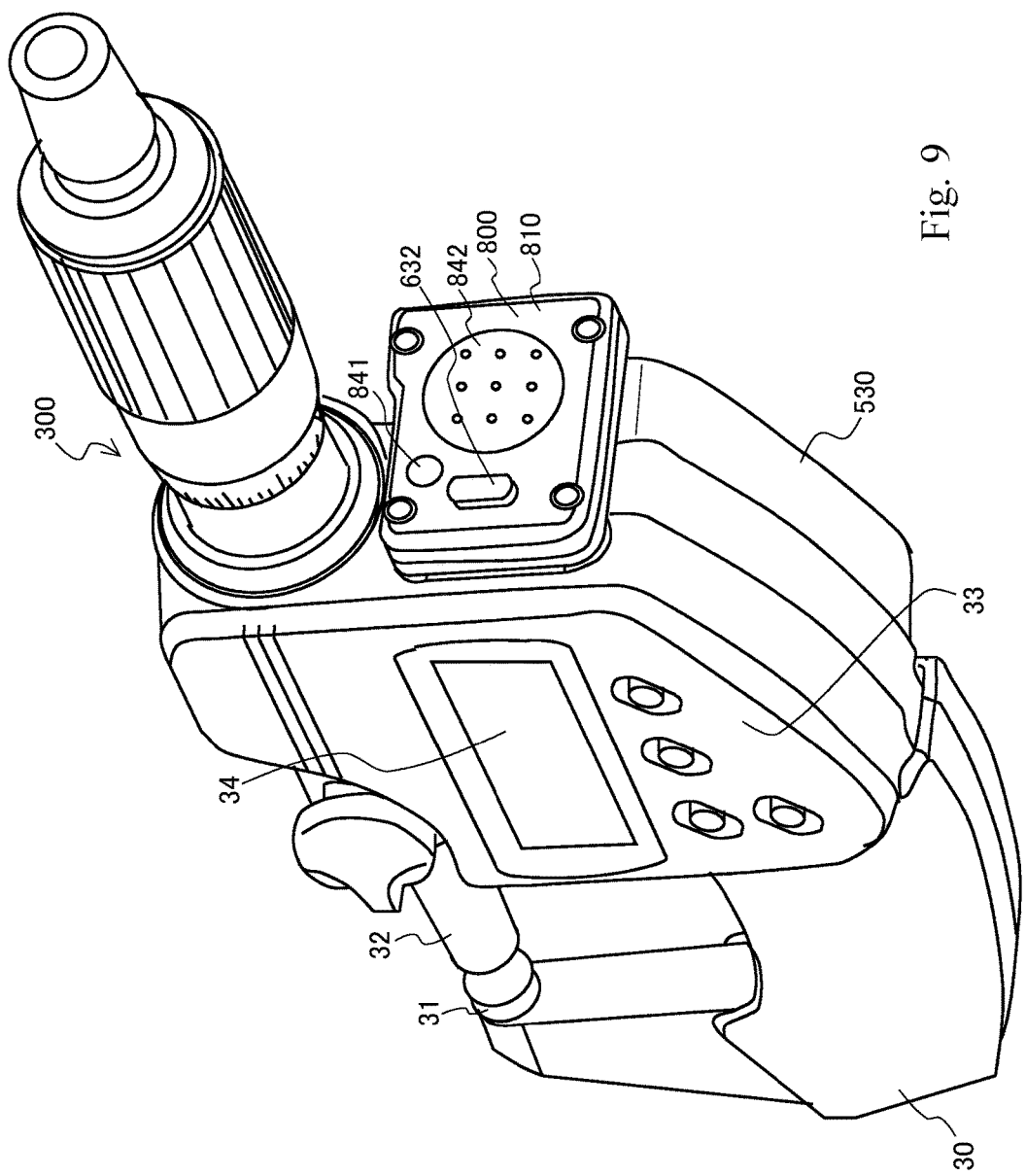
FIG. 9 is a diagram illustrating a micrometer connected to an external device by the connection unit as the first modified example.

FIG. 9 is a diagram illustrating a micrometer 300 connected to an external device 530 by the connection unit 800.

The connection unit 800 in the first modified example differs from the connection unit 600 in the first exemplary embodiment in that a lamp 841 and a speaker 842 are provided on the upward facing surface of a connection unit main part 810 in addition to an operation button 632. The lamp 841 notifies a user of a data transmission/reception status (success or failure in transmission or reception) by lighting (continuous lighting, blink, or color changing). The lamp 841 is, for example, an LED. The speaker 842 notifies the user of a data transmission/reception status (success or failure in transmission or reception) by buzzing.

Although such notification means may be provided at measurement devices 100 to 400 or external devices 510 to 540, by providing the notification means at the connection unit 800, the number of functions of the external devices 510 to 540 or the measurement devices 100 to 400 can be reduced accordingly. This facilitates downsizing of the measurement devices 100 to 400 and the external devices 510 to 540, and leads the flexibility in design.

Note that, the present invention is not limited to the above embodiments, and can be appropriately changed without deviating from the scope.

If the type of the connection port of the first micrometer 300 is a third type connection port and the type of the connection port of the second micrometer 400 is a fourth type connection port, the above effects can be similarly obtained. Although two types of connection units are further required, an external device can be used commonly by the first micrometer 300 and the second micrometer 400 only with the additional cost of the two types of connection units.

The external device may be a battery, a light, a memory, or a printer in addition to a wireless communication device and a sub display.

The operation button may be replaced with various types of operation means other than a push button such as a toggle switch.

The measurement device may be various measurement devices such as a dial gauge in addition to a caliper and a micrometer.

Then, the cost reduction effect according to the present invention is extremely large when multiple optional functions (a wireless communication device, a sub display, a battery, a light, a memory, a printer, and the like) are desired to be added to multiple measurement devices (a caliper, a micrometer, a dial gauge, and the like).

In other words, it is possible to appropriately select multiple external devices (a wireless communication device, a sub display, a battery, a light, a memory, a printer) and attach the selected external devices to each measurement device via the connection unit according to the present invention.

Thus, it is possible for a user to construct a measurement device optional system at a low price and significantly reduce the cost, only by preparing external devices having desired functions and required connection units corresponding to (the shape of the connection port of) each measurement device.

The invention claimed is:

1. A connection unit comprising:
    a connection unit main part;
    a connector terminal for measurement device provided at the connection unit main part and connected to a signal inputting/outputting connection port of a measurement device; and
    a connector terminal for external device provided at the connection unit main part and connected to a signal inputting/outputting connection port of an external device, wherein
    the external device is electrically connected to the measurement device.

2. The connection unit according to claim 1, wherein the connection unit main part is provided with a manually operable switch.

3. The connection unit according to claim 1, wherein the connection unit main part is provided with at least either of a lamp or a speaker.

4. The connection unit according to claim 1, wherein the connection unit main part has a flat plate shape.

5. The connection unit according to claim 1, wherein
    the connector terminal for measurement device and the connector terminal for external device are provided on the same surface of the connection unit main part, and
    the surface of the connection unit main part on which the connector terminal for measurement device and the connector terminal for external device are provided is substantially flat.

6. The connection unit according to claim 1, wherein the connection unit main part is molded with resin.

7. A measurement device optional system comprising:
    a connection unit according to claim 1;
    several different types of measurement devices having a signal inputting/outputting connection port; and
    several different types of external devices having a signal inputting/outputting connection port, wherein
    the measurement device is electrically connected to the external device via the connection unit, and
    the type of the connection port of the external devices is uniform ed.

8. The measurement device optional system according to claim 7, wherein the at least one external device has a function selected from a wireless communication device, a sub display, a battery, a light, a memory, and a printer.

9. The measurement device optional system according to claim 7, wherein the at least one measurement device is a caliper, a micrometer, or a dial gauge.

* * * * *